United States Patent [19]

Santandrea

[11] Patent Number: 5,239,743
[45] Date of Patent: Aug. 31, 1993

[54] METHOD FOR MAKING STATORS FOR ELECTRIC MOTORS AND THE LIKE

[75] Inventor: Luciano Santandrea, Florence, Italy

[73] Assignee: Axis USA, Inc., Marlborough, Mass.

[21] Appl. No.: 850,963

[22] Filed: Mar. 11, 1992

Related U.S. Application Data

[60] Continuation of Ser. No. 628,476, Dec. 17, 1990, Pat. No. 5,099,568, which is a division of Ser. No. 385,570, Jul. 26, 1989, Pat. No. 4,994,697.

[51] Int. Cl.$^5$ ............................................. H02K 15/10
[52] U.S. Cl. ........................................ 29/596; 310/42; 310/71; 310/214
[58] Field of Search ................... 29/596, 598; 310/42, 310/43, 71, 214, 215, DIG. 6

[56]        References Cited
        U.S. PATENT DOCUMENTS

| Re. 28,831 | 5/1976 | Brown | 310/194 |
|---|---|---|---|
| 3,747,187 | 7/1973 | Colwell | 29/203 D |
| 3,979,615 | 9/1976 | Neff | 310/71 |
| 3,984,712 | 10/1976 | Hill | 310/71 |
| 3,984,908 | 10/1976 | Ackley | 29/205 D |
| 4,038,573 | 7/1977 | Hillyer | 310/71 |
| 4,074,418 | 2/1978 | Pearsall | 29/596 |
| 4,224,543 | 9/1980 | Morreale | 310/71 |
| 4,318,022 | 3/1982 | Miller | 310/260 |
| 4,490,636 | 12/1984 | McBratney | 310/71 |
| 4,585,964 | 4/1986 | Hildebrandt | 310/71 |
| 4,612,702 | 9/1986 | Wheeler | 29/596 |
| 4,679,312 | 7/1987 | Nussbaumer et al. | 29/596 |
| 4,713,883 | 12/1987 | Santandrea et al. | 29/736 |
| 4,762,283 | 8/1988 | Sabatino | 242/1.1 R |
| 4,831,716 | 5/1989 | Luciani et al. | 29/596 |
| 4,904,893 | 2/1990 | Snider et al. | 310/71 X |
| 5,099,164 | 3/1992 | Wheeler | 29/596 X |

FOREIGN PATENT DOCUMENTS

| 191195 | 8/1986 | European Pat. Off. . |
|---|---|---|
| 207386 | 1/1987 | European Pat. Off. . |
| 2617156 | 11/1976 | Fed. Rep. of Germany . |
| 1568077 | 5/1969 | France . |
| 2168858 | 9/1973 | France . |
| 1209682 | 10/1970 | United Kingdom . |
| WO89/01257 | 2/1989 | World Int. Prop. O. . |

Primary Examiner—Carl E. Hall
Attorney, Agent, or Firm—Robert R. Jackson; Karen G. Horowitz

[57]        ABSTRACT

The axial end portions of the insulating members which are used to line the longitudinal channels formed between circumferentially adjacent, radially inwardly projecting poles in a stator (e.g., an electric motor stator) are protected from damage by the wire being wound by providing terminal boards at each axial end of the stator having portions which overhang the axial ends of the insulating members. Temporary wire grippers may also or alternatively be mounted on the axial ends of the stator (e.g., on the above-mentioned terminal boards) for temporarily holding the leads of the stator coils prior to permanent termination of those leads on permanent terminals on the terminal boards.

3 Claims, 10 Drawing Sheets

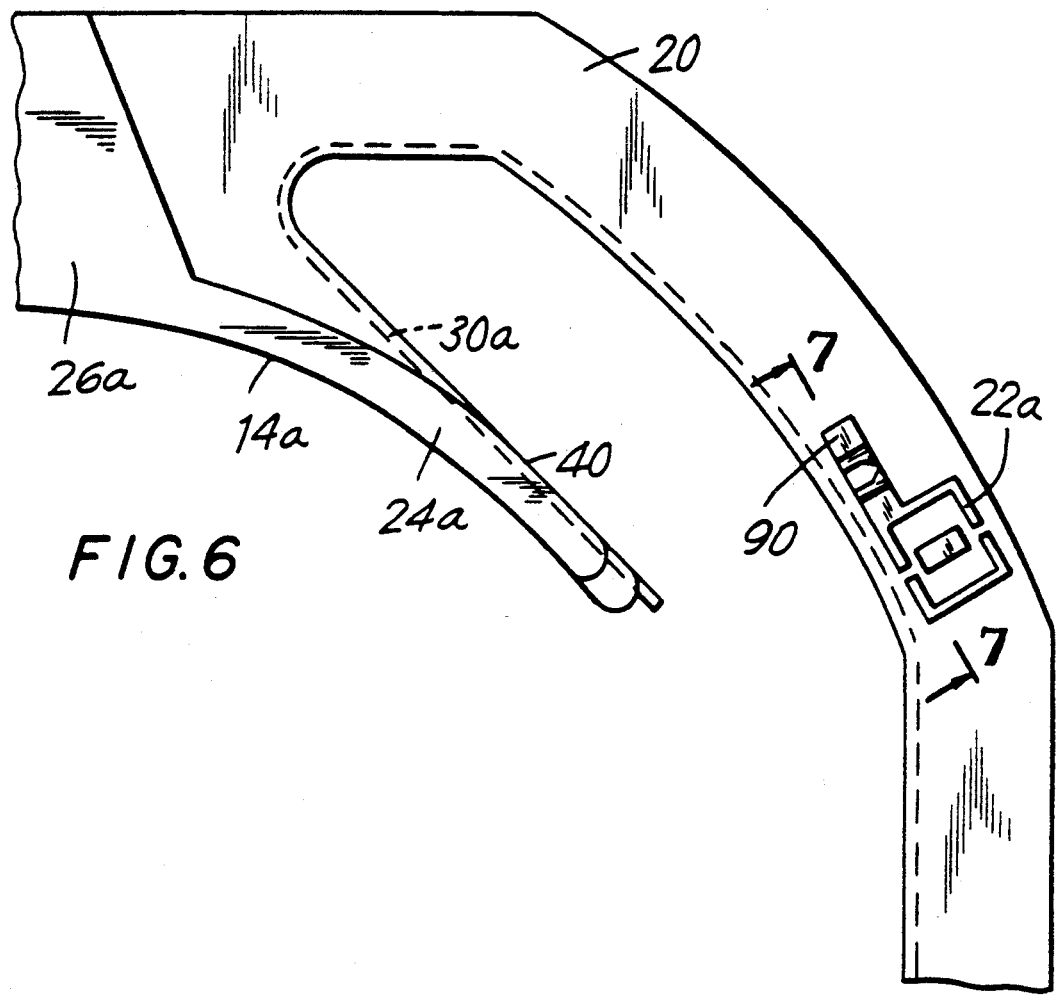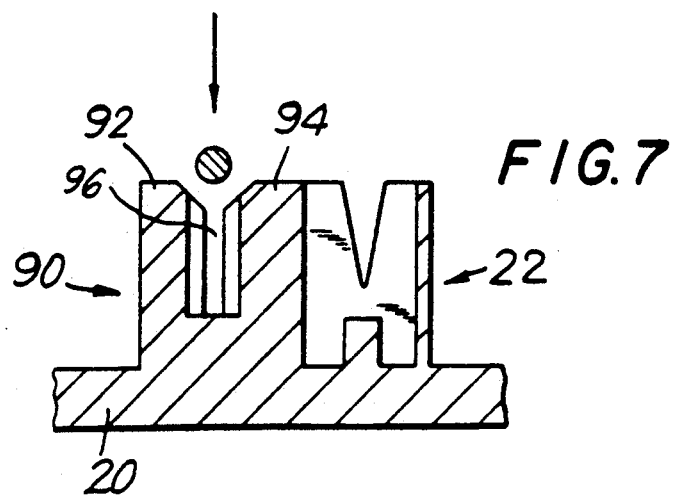

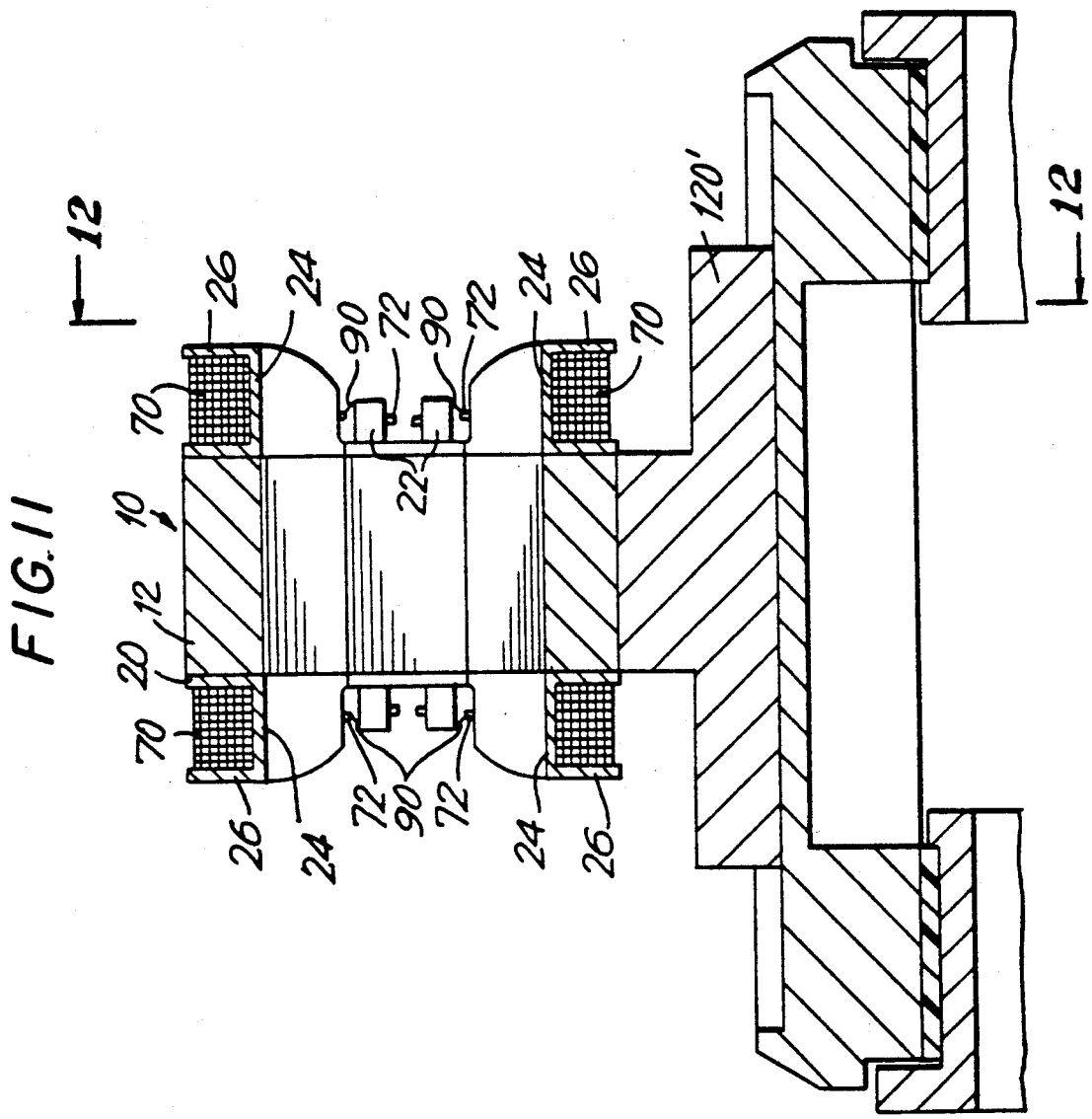

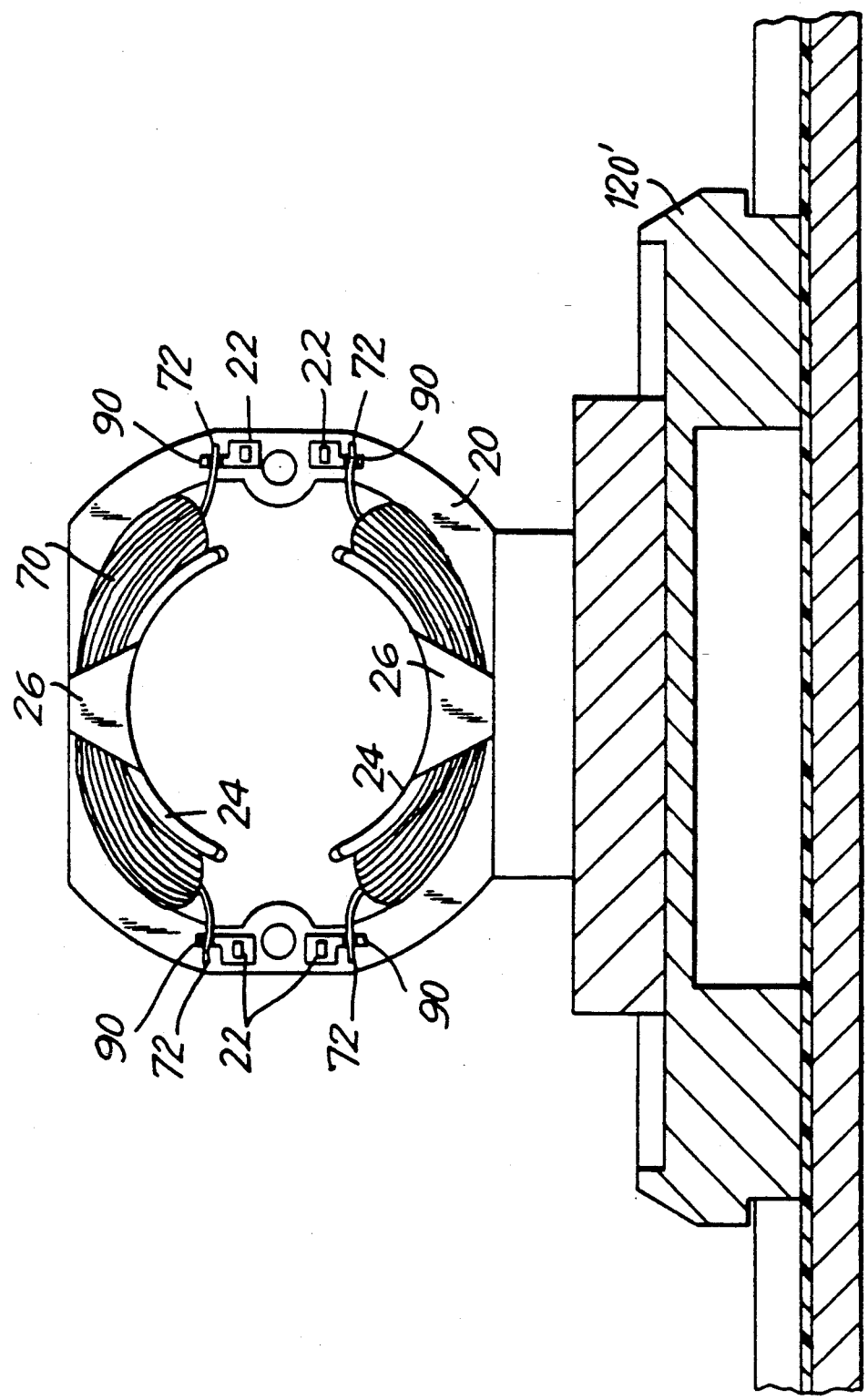

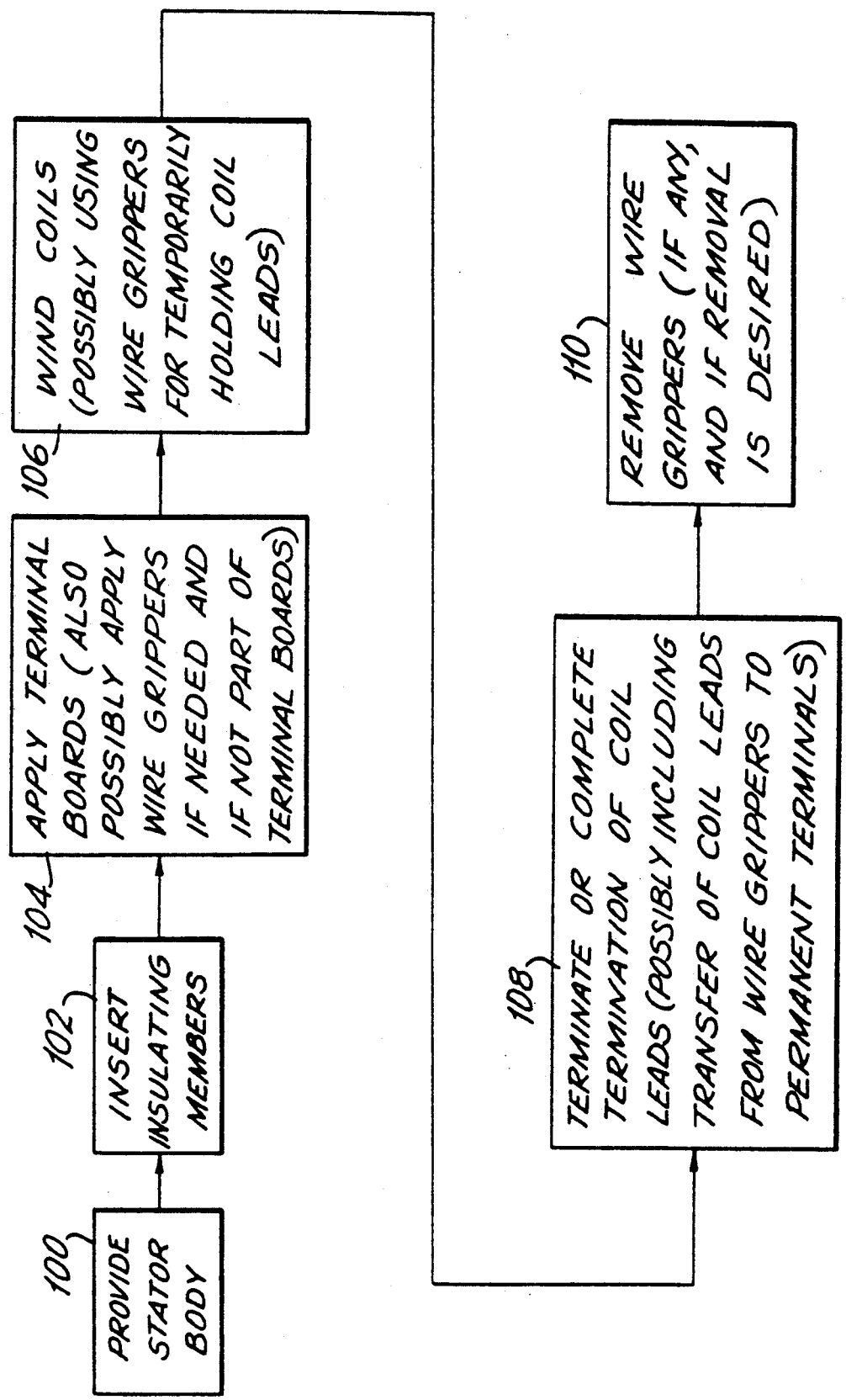

METHOD FOR MAKING STATORS FOR ELECTRIC MOTORS AND THE LIKE

This is a continuation of application Ser. No. 07/628,476, filed Dec. 17, 1990 now U.S. Pat. No. 4,099,568, which is a division of application Ser. No. 07/385,570, field Jul. 26, 1989 now U.S. Pat. No. 4,994,697.

BACKGROUND OF THE INVENTION

This invention relates to methods and apparatus for making stators for electric motors and similar machines such as generators. Although the invention is described herein in the context of its application of electric motor stators, it will be understood that it is equally applicable to other types of stators such as have been mentioned.

Terminals boards for electric motor stators are insulating members which are typically placed on both axial ends of the main stator body for such purposes as supporting the axial ends of the windings wound on the poles of the stator and providing insulated attachment points for the terminals at which the ends of the coil wires can be connected to wires external to the stator.

Recently there has been increasing interest in winding stators without winding forms (see, for example, Wheeler U.S. Pat. No. 4,612,702). This can simplify the winding apparatus and speed the winding process, but it can also increase the strain and wear on the insulting inserts which are typically placed in the stator between circumferentially adjacent poles in order to prevent short circuits between the coils and the stator. Such strain and wear can compromise the insulating effectiveness of the insulating member, possibly resulting in short circuits to the stator. Dislocation or distortion of the insulating member may also occur, possibly resulting in vibration or interference with free rotation of the armature in the finished motor.

In view of the foregoing, it is an object of this invention to provide stator making methods and apparatus, and especially terminal boards, which better protect the associated insulating inserts, especially during winding without winding forms, but even when winding forms are used, if desired.

Another problem which may be exacerbated when winding without winding forms is the possibility that some winding turns in the axial ends of the coils, and especially those winding turns which are intended to fill the area close to the axial end of the stator and in the radially outermost portion of the coil, may not be sufficiently tight or close together to preclude undesirable vibration of those winding turns during operation of the finished motor.

It is therefore another object of this invention to provide stator making methods and apparatus, and especially terminal boards, which promote tight, regular, and complete winding and filling of the stator coils, especially during winding without winding forms, but also when winding forms are used, if desired.

In some electric motor stators the ends of the coil wires (i.e., the so-called start and finish leads) are anchored directly in the terminal receptacles on the terminal board (see, for example, Pearsall U.S. Pat. No. 4,074,418). Metal terminals are then pushed into the receptacles to make electrical contact with the coil wires. In other motors, however, the ends of the coil wires must be held temporarily during and after winding. At a subsequent termination station the ends of the coil wires are relocated to terminals mounted on the terminal board. In the past, the elements for temporarily holding the ends of the coil wires have been provided on the pallets or other structures which support and/or convey the stators (see, for example, Wheeler U.S. Pat. No. 4,612,6702, Nussbaumer et al. U.S. Pat. No. 4,679,312, and Santandrea et al. U.S. Pat. No. 4,713,883). Providing elements for temporarily holding the ends of the wire coils on the pallet or other coil supporting structure (hereinafter referred to generically as a pallet) has a number of disadvantages. For one thing, these wire-holding elements complicate the pallet, thereby increasing its costs. The presence of these wire-holding elements around the stator also make it more difficult to place the stator on or remove the stator from the pallet. The stator-handling elements which perform these tasks must be designed so that they do not interfere with the wire-holding elements. The need for wire-holding elements on the pallet may make it difficult or impossible to use the same pallet for stators of different size (e.g., different stack height). A substantial amount of wire may be needed to temporarily reach wire-holding elements on the pallet. This wire may have to be cut off and discarded when the wire is finally permanently terminated on the terminal board. The fact that the coil ends are temporarily attached to the pallet may make it more difficult or impossible to use certain permanent termination techniques which would otherwise be advantageous. For example, it may be difficult or impossible to employ permanent termination apparatus which requires removal of the stator from the pallet.

In view of considerations such as the foregoing, it is still another object of this invention to provide improved methods and apparatus for temporarily holding the ends of coil wires during and after winding the coils on the poles of a stator.

SUMMARY OF THE INVENTION

These and other objects of the invention are accomplished in accordance with the principles of the invention by providing a terminal board having a lip or bead which projects out over the axial end of the insulating member which lines the channel between circumferentially adjacent poles of a stator. This lip or bead performs such functions as protecting the end of the insulating member, preventing the insulating member from shifting axially relative to the stator, and ensuring that the wire being wound bears on the terminal board and not on the more fragile axial end of the insulating member as the wire is drawn around the poles of the stator. This lip or bead also promotes depositing the axial ends of the coils close to the axial ends of the stator, thereby improving the tightness, regularity, density, and efficiency of the coils. The foregoing features are especially useful when winding stators without winding forms, although they may also be useful even when winding forms are employed.

The stators (preferably the terminal boards) of this invention may also have grippers for temporarily holding the ends of the coil wires so that these ends can be subsequently picked up and relocated to terminals permanently mounted on the terminal board. This has a great many advantages including facilitating processing of stators on and off pallets, simplifying the design of the apparatus which must handle the stator after winding but before the coils are permanently terminated, facilitating the design of apparatus which can handle stators of different sizes (e.g., different stack heights), and reducing wire consumption.

Further features of the invention, its nature and various advantages will be more apparent from the accompanying drawings and the following detailed description of the preferred embodiments.

BRIEF DESCRIPTION OF THE DRAWINGS

FIG. 6 is an enlargement of a portion of FIG. 1.

FIG. 7 is a detail view taken alone the line 7—7 in FIG. 6.

FIG. 11 is a partly sectional view of a stator constructed in accordance with this invention mounted in an alternative way on an alternative pallet.

FIG. 12 is a sectional view taken along the line 12—12 in FIG. 11.

FIG. 13 is a flow chart of stator making methods in accordance with this invention. FIG. 13 is also a schematic block diagram of stator making apparatus in accordance with this invention.

DETAILED DESCRIPTION OF THE PREFERRED EMBODIMENTS

Figure 1:
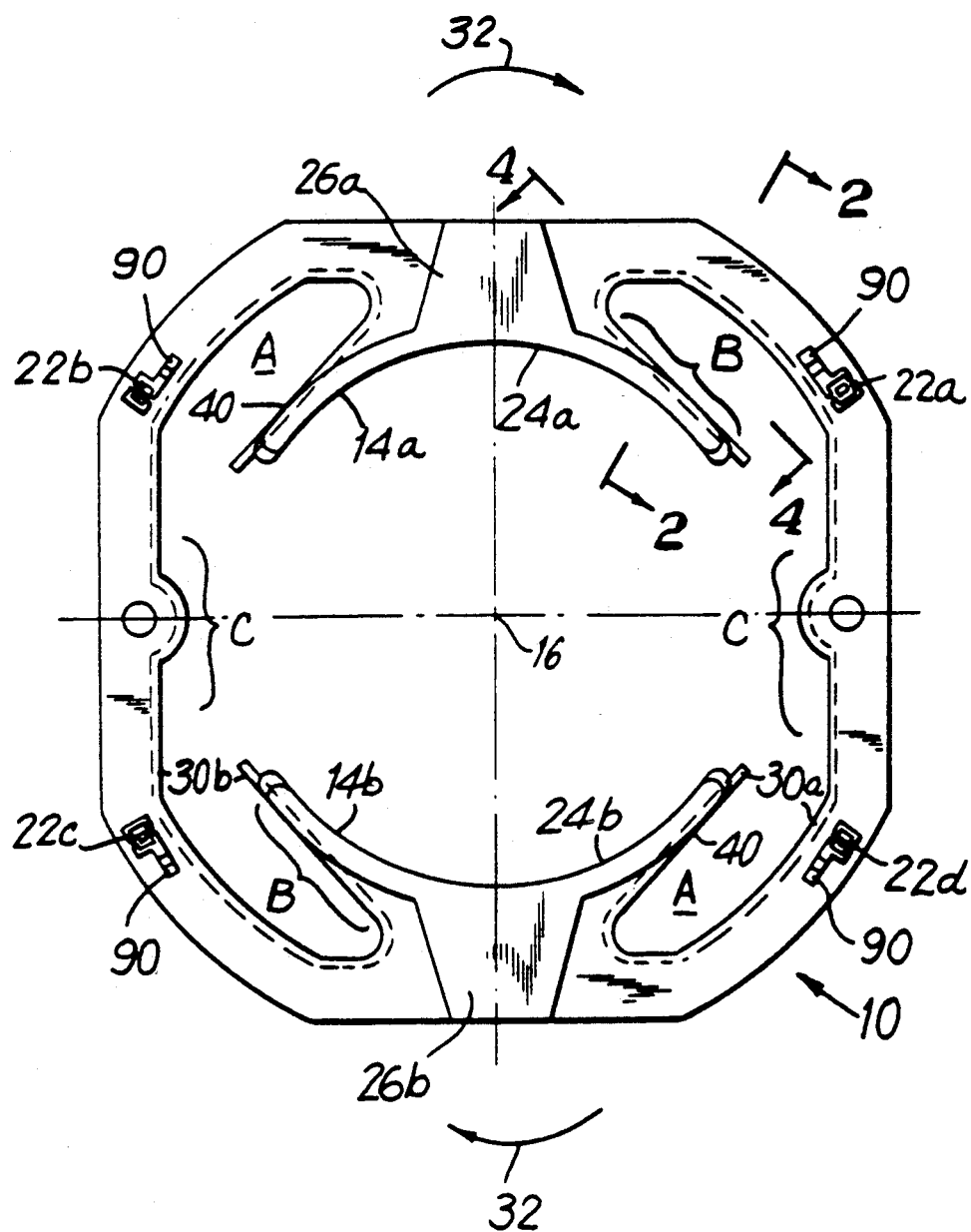
FIG. 1 is an axial end view of an illustrative embodiment of a stator constructed in accordance with the principles of this invention prior to winding coils on the stator poles.

FIG. 1 shows a terminal board 20 constructed in accordance with this invention and mounted on an axial end of a stator 10. Terminal board 20 is a complete annular ring, although it could also be made up of two or more semiannularly (meaning partly annular) segments. Behind terminal board 20 in FIG. 1 is the stack of metal laminations 12 (see FIG. 2) which forms the main body of the stator. Terminal board 20 itself is typically made of an insulating material such as plastic. Terminal board 20 typically includes terminal receptacles (e.g., receptacles 22a-d), at least some of which hold or will receive metal terminals (e.g., terminal 50 in FIG. 2) to which the ends of the stator coil wires are attached to facilitate making electrical connections to the stator. (The terminal receptacles 22 shown in the drawings are for terminals of the type which are generally inserted when the stator is in the termination station after the coils have been wound. The depicted terminals 50, on the other hand, are of a type which are generally inserted before the terminal board is applied to the stator. These two different types of apparatus are depicted merely to make it clear that the present invention can be used in either case.)

In the depicted illustrative embodiment, stator 10 has two poles 14a and 14b, although it could have more poles if desired. In front of each pole 14 terminal board 20 has a coil holder 24a, 24b which extends axially outward from the portion of the terminal board which is adjacent to the surface of the pole that is concentric with central longitudinal axis 16. At the axial end of each coil holder 24 which is remote from the main annular portion of terminal board 20 each coil holder has a coil retainer tab 26a, 26b which projects radially outward from the associated coil holder.

Before terminal board 20 is mounted on stator stack 12, an insulating member, insert, or liner 30a, 30b is pushed axially into each channel which exists between circumferentially adjacent stator poles. Each insert 30 is preferably axially somewhat longer than the stator stack (excluding terminal boards 20) so that each insert projects slightly from each axial end of the stator stack prior to attachment of terminal boards 20. After inserts 30 are in place, a terminal board 20 is mounted on each axial end of the stator stack as shown in FIGS. 1 and 2.

Figure 2:
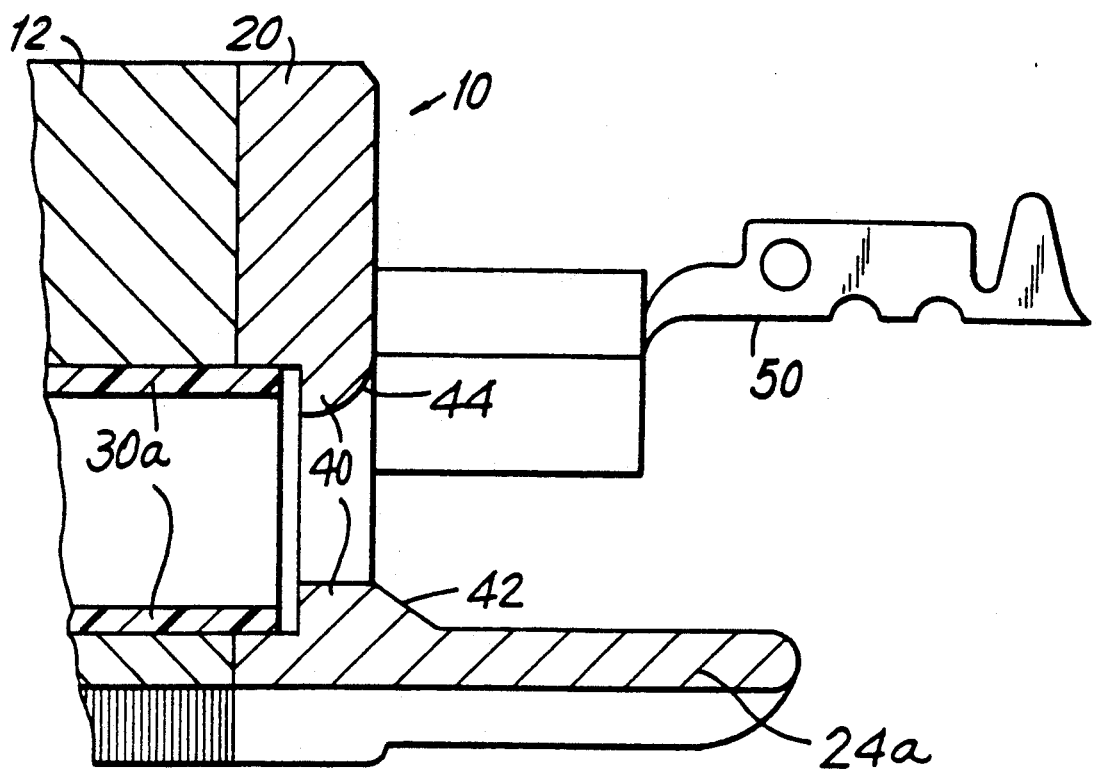
FIG. 2 is a partial sectional view taken along the line 2—2 in FIG. 1.
Figure 3A:
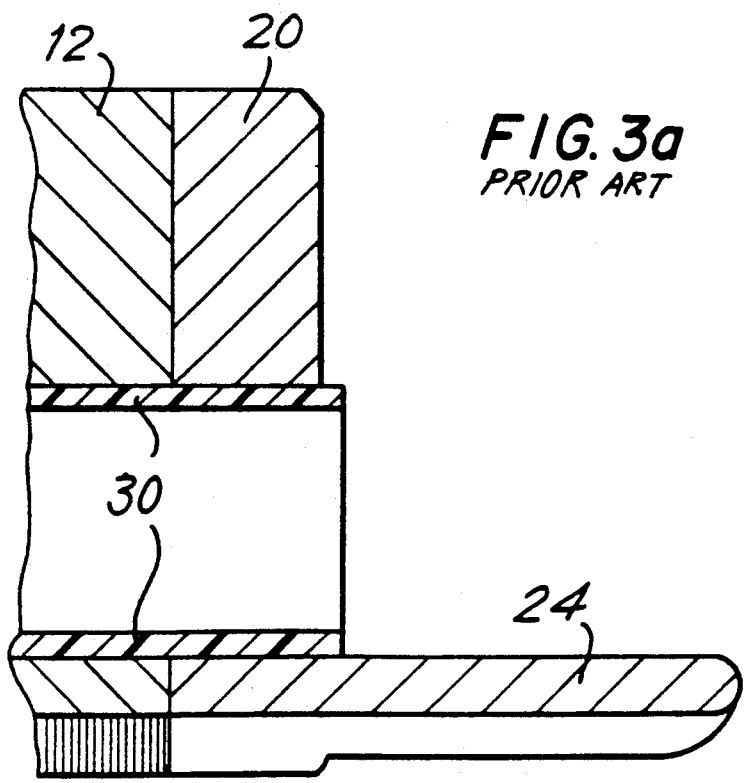
FIG. 3a is a view similar to FIG. 2, but showing a prior art structure.

As can be seen in FIG. 1, the main annular portion of terminal board 20 has generally the same shape and extent as the associated axial end of stator stack 12 except for a lip or bead 40 which projects over and therefore covers the axial end of the adjacent insert 30 (see also FIG. 2). The prior situation without this bead is illustrated by FIG. 3a (in which the reference numbers 20 and 24 are used merely to help the reader identify generally corresponding parts of the structure and not to mean that the FIG. 2 structure forms part of the present invention). In accordance with this invention, lip or bead 40 protects the axial ends of inserts 30 during winding of the coils on poles 14, especially when these coils are wound without winding forms. In particular, it has been found that when the stator is wound without terminal boards having lip or bead 40 (e.g., terminal boards as shown in FIG. 3a), the wire emerging, for example, from region A tends to hit the axial end portion of the adjacent insert 30 which is radially outward from region A. (Arrows 32 show the direction of motion of the needles which wind the wire in this example.) This hitting of insert 30 can have several undesirable results. For example, it can corrugate the insert (due to the wire sliding or running on the exposed surface of the inset), causing the material of the inset to displace at other locations (e.g., in region C where the inset may bulge radially inwardly so that it can vibrate against the stator stack when the finished motor is operated or so that the insert interferes with rotation of the armature). Hitting of the insert can also break through the inset, with the possible loss of insulation between the coil and the stator stack. The portion of lip or bead 40 which is radially outward from region A protects this part of the axial end of insert 30 and thereby eliminates or at least greatly reduces the foregoing possible problems.

This portion of lip or bead 40, as well as other portions of the lip or bead in the vicinity of region A, also provides a smooth surface (which is typically harder than insert 30) on which the wire can more readily move or run in the circumferential direction as the end of the wire-winding needle (not shown) passes over the top (or bottom) of retainer tab 26 in order to pull the windings tightly around the poles. By facilitating the circumferential movement of coil wires during winding in this manner, lip or bead 40 may also improve the resulting coils, for example, by helping the coils to wind more tightly, regularly, and densely about the poles and by reducing the possibility that voids will form in the coil, especially close to the axial end of the stator, as the winding proceeds.

On the other side of each pole 14, as the wire being wound re-enters the stator (e.g., adjacent region B), the wire must bend generally about edge B and may also need to move along edge B. Once again, the presence of lip or bead 40 overhanging and thereby protecting the axial end of inset 30 prevents the wire from damaging the insert, with possible loss of insulation between the coil and the stator stack, Lip or bead 40 in region B also ensures that the wire contacts a smooth, hard surface which facilitates motion of the wire along edge B. As in the case of the portion of the lip or bead 40 in the vicinity of region A, this may help produce better windings by increasing the tightness, regularity, density, and completeness of the coils.

Figure 3B:
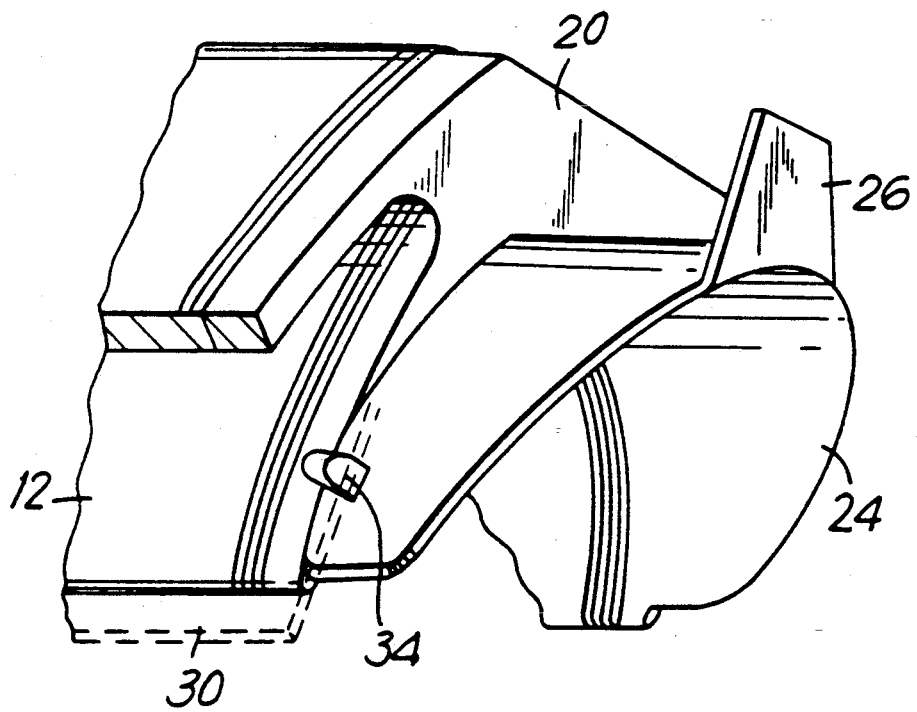
FIG. 3b is a partial perspective view of a prior art stator structure.
Figure 4:
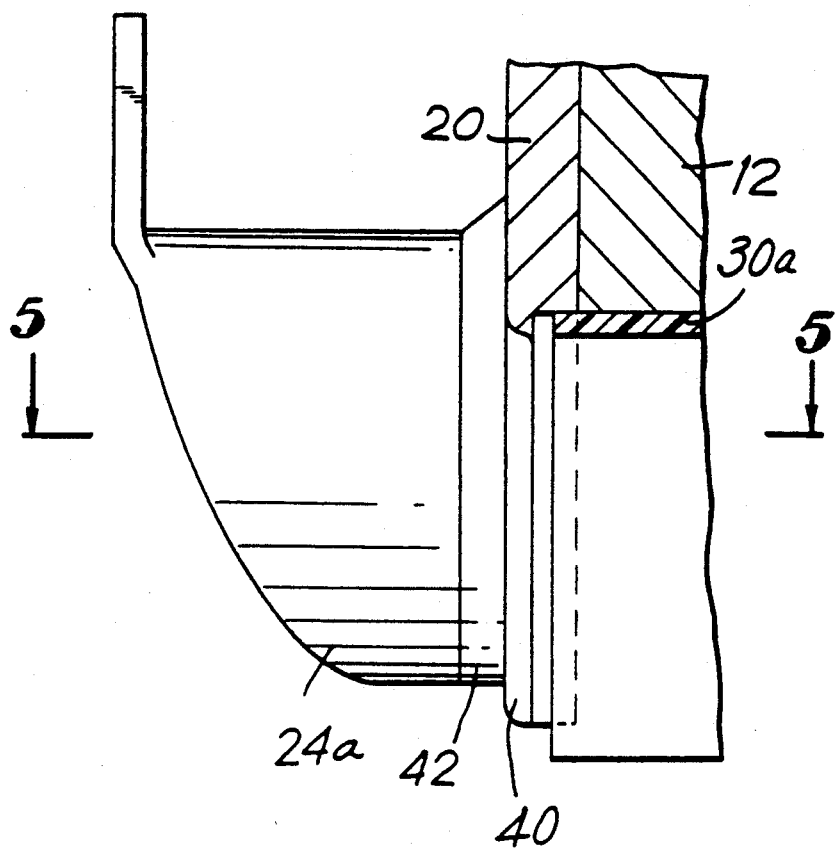
FIG. 4 is a partial sectional view taken along the line 4—4 in FIG. 1.

Another advantage of lip or bead 40 on the terminal boards at both ends of the stator stack is that these lips or beads held to hold inserts 30 in their proper axial positions in the stator and reduce the risk that an inset may be dislocated by handling of the stator or before enough windings have been applied to permanently retain the inserts. Small, localized clips 34 (FIG. 3b) have been used in the past to help hold insert 30 in place both axially and radially. But structures like continuous lip or bead 40, with all the additional advantages described above, were unknown prior this invention.

Figure 5:
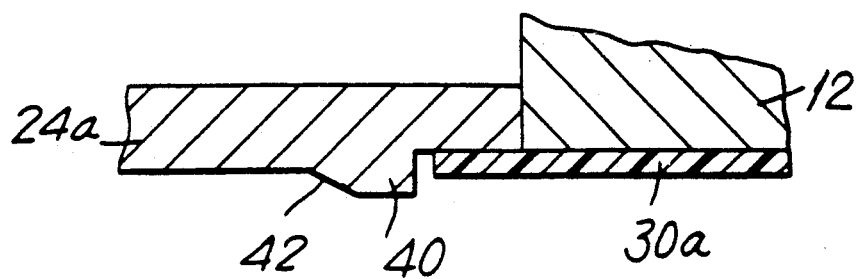
FIG. 5 is a partial sectional view taken along the line 5—5 in FIG. 4.

Note that (as shown in FIG. 2) in order to prevent coil holders 24 from becoming too thick as a result of the need to provide the adjacent portion of lip or bead 40, that portion of terminal board 20 is thicker in the radial direction than either the portion which is immediately adjacent the stator stack or the portion which forms coil holder 24. The transition from coil holder 24 to this thicker portion is preferably inclined as shown at 42 in FIGS. 2 and 5. This incline promotes running of wire being wound toward the adjacent stator pole, which tends to improve the coil sin the ways that have been mentioned above. Also note that the bead surface 44 on the other side of the channel depicted in FIG. 2 is preferably inclined relative to both the longitudinal axis of the stator and the axial end face of the stator so that surface 42 and 44 are synclinal in the direction into the stator.

If desired, wire grippers 90 can be mounted on one or both axial ends of the stator (e.g., by being mounted on one or both of terminal boards 20 as shown in FIGS. 1 and 6) for temporarily holding a coil lead prior to permanent termination of that lead on the terminal 50 in an adjacent terminal receptacle 22. Grippers 90 can be at any convenient locations on ends of the stator or the associated terminal boards 20. After the stator has been wound, it is typically passed form the winding station to a terminating station. In the terminating station, each coil lead is removed from its gripper 90 and permanently terminated on a terminal 50 in a terminal receptacle 22.

Although various gripper constructions can be used, FIGS. 1, 6, and 7 show one illustrative form of gripper 90 which is integral with terminal board 20. Gripper 90 has two upstanding members 92 and 94 with a slot 96 therebetween. The smallest portion of slot 96 is narrower than the diameter of the wire lead 72 to be held in gripper 90. Accordingly, wire lead 72 can be pushed down into slot 96 which then holds the lead until it is subsequently lifted out and relocated to a terminal 50 in an adjacent terminal receptacle 22.

The number of grippers 90 will typically correspond to the number of leads to be temporarily held, although additional grippers 90 may be provided in the event that a lead is to be temporarily anchored in a first gripper, then relocated to one or more other grippers before being finally terminated on a terminal 50. Note that some motors are made with more than one coil per pole, and/or with coils having intermediate taps. Grippers 90 can be used for the start, intermediate (if any), and finished leads of each coil.

Figure 8:
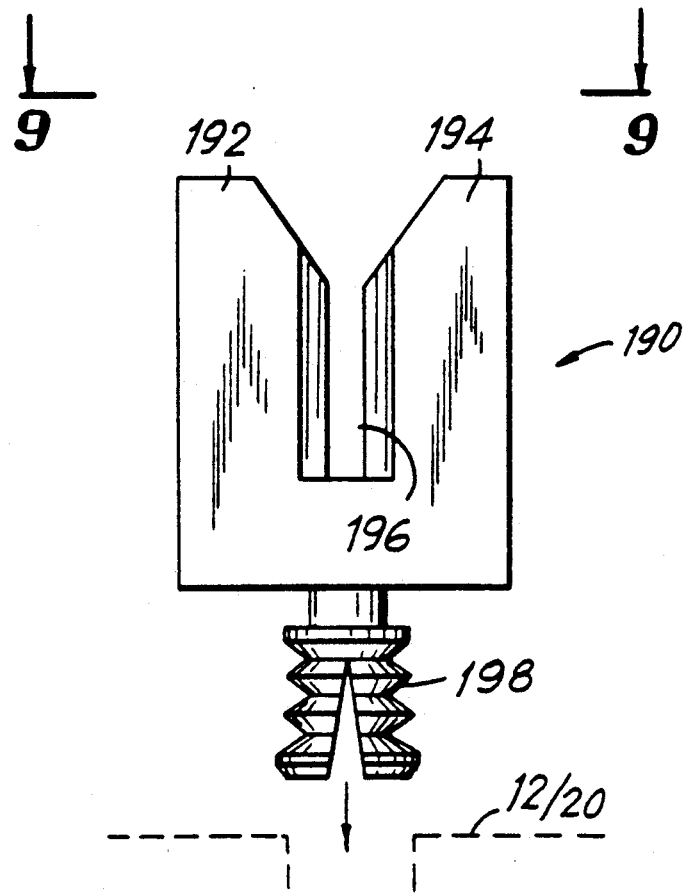
FIG. 8 is an elevational view of an alternative embodiment of apparatus constructed in accordance with this invention.
Figure 9:
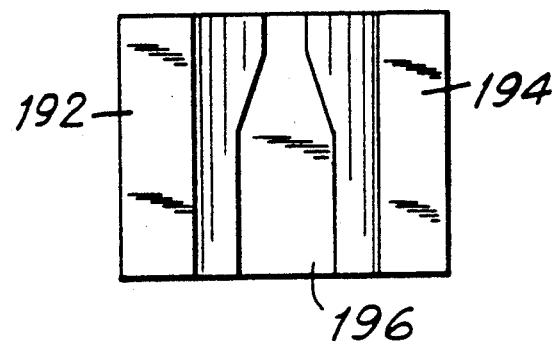
FIG. 9 is a view taken along the line 9—9 in FIG. 8.

If desired, after they have performed their temporary wire-holding function, grippers 90 can be knocked off or otherwise removed from the stator. For example, FIGS. 8 and 9 show an alternative gripper 190 which is not integral with terminal board 20. Instead, gripper 190 is a separate element which can be plugged into a simple hole in terminal 20 (or stator body 12 if the gripper is at a location not covered by terminal board 20) by means of pin 198. As in the case of gripper 90, a wire lead can be temporarily held in slot 196 between upstanding members 192 and 194. At the appropriate time, the wire lead can be removed from slot 196 and permanently secured to a terminal 50. Thereafter, gripper 190 can be removed from the stator (e.g., by pulling pin 198 out of the associated terminal board hole or by shearing gripper 190 off above pin 198).

Figure 10:
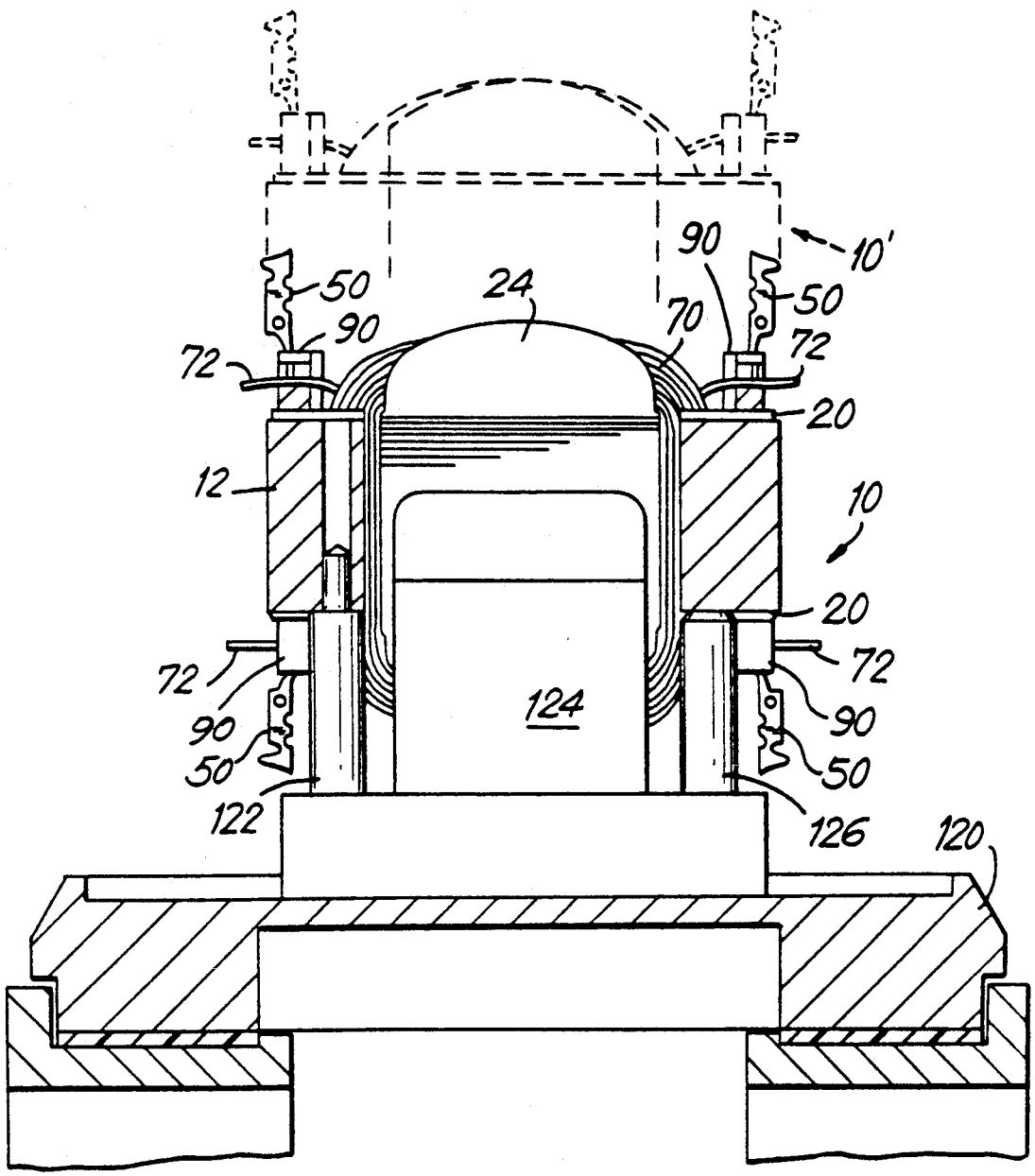
FIG. 10 is a partly sectional view of a stator constructed in accordance with this invention mounted on a pallet.

The placement of grippers 90 or 190 (hereinafter referred to generically as grippers 90) on stator stack 12 or terminal board 20 rather than on the pallet or other apparatus which holds the stator during processing has several important advantages. For example, FIG. 10 shows stator 10 being transported vertically on pallet 120 having pin 122, central column 124, and peg 126 for positioning the pallet with the required precision. In FIG. 10 coils 70 have been wound on the stator, leads 72 are temporarily secured in grippers 90, and terminals 50 are in place but not yet connected to wire leads 72. Accordingly, FIG. 10 shows stator 10 as it might be conveyed on pallet 120 from a coil winding station to a lead terminating station.

Because leads 72 are held in grippers 90 on the stator rather than in elements mounted on pallet 120, stator 10 can be readily placed on or removed from pallet 120 at either or both of the winding and lead terminating station. The area around the stator is not cluttered by lead-holding elements, thereby simplifying the design of the apparatus required to remove the stator 10 from pallet 120 or to place the stator back on the pallet. The amount of lead wire required to reach the wire-holding elements is also reduced by having the elements (i.e., grippers 90) right on the stator. And if it is desired to process stators (e.g., stators 10') of a different size (e.g., a different stack height ), no changes or considerably fewer charges are required to pallet 120 than if wire leads 72 were held by elements on the pallet. FIGS. 11 and 12 show that similar advantages obtain when stator 10 is transported horizontally on pallet 120'. Such horizontal transport may be advantageous in certain situations (e.g., when leads are to be terminated at both ends of the stator).

As has bee mentioned, FIG. 13 is a flow chart of the stator making methods of this invention. FIG. 13 is also a block diagram of the stator making apparatus of this invention. In step or station 100 stator stack or body 12 is provided in any conventional manner. In step or station 102 insulating members 30 are inserted in the longitudinal channels which are present in the stator between circumferentially adjacent poles. This step or station can also be conventional (see, for example, Luciani et al. U.S. Pat. No. 4,831,716 which shows suitable apparatus of this kind). In step or station 104 terminal boards 20 are attached to the axial ends of the stator body in any conventional manner. One or both of these terminal boards may include wire grippers 90. Alternatively, wire grippers 90 may be mounted directly on stator body 12 in step or station 104.

In step or station 106 coils are wound on the stator poles. Luciani et al. U.S. patent application Ser. No. 321,919, filed Mar. 13, 1989, shows apparatus suitable for manipulating the start and finish leads of stator coils. This or other known apparatus can be readily adapted to deposit the start and/or finish leads of the coils in wire gripper 90 if desired. (Of course, if wire grippers 90 are not needed and the start and finish leads can be anchored directly in terminal receptacles 22, then other known apparatus such as that shown in Pearsall U.S. Pat. No. 4,074,018 can be used in step or station 106 for handling the start and finish leads.) Various known coil winding needle structures and motions can be used to actually wind the coils in step or station 106 (see, for example, Wheeler U.S. Pat. No. 4,612,702 and Luciani U.S. Pat. No. 4,762,283 which show suitable needle structures and motions).

Following step or station 106, the stator is typically moved from the winding station to a terminating station 108 where the state and finish leads are terminated or where the termination of those leads is completed. For example, if the start and finish leads have been anchored directly in terminal receptacles 22 as in Pearsall U.S. Pat. No. 4,074,418, then in step or station 108 a metal terminal is typically pushed into each terminal receptacle in the known manner to make contact with and complete the termination of each lead. On the other hand, if the coil leads are being temporarily held by wire grippers 90, then in step or station 108 each such lead is removed from its wire gripper and transferred to the appropriate permanent metal terminal. The known apparatus for transferring such leads from the wire grippers on pallets or other stator holding apparatus to permanent terminals as in Wheeler U.S. Pat. No. 4,612,702, Nussbaumer et al. U.S. Pat. No. 4,679,312, and Santandrea et al. U.S. Pat. No. 4,713,883 can be readily modified to transfer leads from wire grippers 90 to permanent terminals 50. Note that the principle disclosed in Santandrea et al. U.S. Pat. No. 4,713,883 of winding and terminating the stator on the pallet can be used with this invention if desired.

If wire grippers 90 have been used, and if it is desired that they not remain on the finished stator, then in step or station 110 wire grippers 90 may be removed by any suitable technique such as by shearing them off or by pulling them out if they are plugged into the stator.

It will be understood that the foregoing is merely illustrative of the principles of this invention and that various modifications can be made by those skilled in the art without departing from the scope and spirit of the invention. For example, wire grippers 90 can be mounted directly on stator stack or body 12 or can be mounted on terminal boards 20 as explained above.

I claim:

1. The method of making a stator comprises the steps of:
   providing a hollow annular stator body having a longitudinal axis and a plurality of radially inwardly projecting poles, circumferentially adjacent poles defining a longitudinal channel therebetween;
   lining the surface of said channel with an insulating member;
   mounting a terminal board on each axial end of said stator body, each terminal board having a major plane which is substantially perpendicular to said longitudinal axis when said terminal board is mounted on said stator body, a portion of said terminal board overhanging the adjacent axial end of said insulator member to cover the axial end of said insulator member, wherein the longest dimension of said overhanging portion is parallel to said major plane; and
   winding a coil of wire around each pole.

2. The method of making a stator comprising the steps of:
   providing a hollow annular stator body having a plurality of radially inwardly projecting poles, circumferentially adjacent poles defining a longitudinal channel therebetween;
   lining the surface of said channel with an insulating member;
   mounting a terminal board on each axial end of said stator body so that a portion of said terminal board overhangs the adjacent axial end of said insulator member;
   winding a coil of wire around each pole; and
   depositing said wire so that a portion of said wire rests on said overhanging portion of said terminal board after winding, whereby said overhanging portion functions as a barrier between said wound wire and said axial end of said insulator member.

3. The method of making a stator comprising the steps of:
   providing a hollow annular stator body having a longitudinal axis, first and second axial ends, and a plurality of radially inwardly projecting poles, circumferentially adjacent poles defining a longitudinal channel therebetween, each said pole having a first longitudinal side and a second longitudinal side;
   lining the surface of each said channel with an insulating member;
   mounting a terminal board on each axial end of said stator body so that a portion of said terminal board overhangs the adjacent axial end of said insulator member, the length of said over-hanging portion being perpendicular to said longitudinal axis;
   winding a coil of wire around each pole by repeatedly translationally depositing said wire on one of said first and second sides of each said pole and circumferentially extending said wire outside said stator body and across said terminal board to reach the other of said first and second sides of said pole; and
   running said wire on said overhanging portion of said terminal board during translational movement of said wire until said wire comes to rest so that said wire is prevented from running on the axial edge of said insulating member, wherein the orientation of said wire changes from substantially parallel to said overhanging portion to substantially perpendicular to said overhanging portion while running along said overhanging portion.

* * * * *